(12) United States Patent
Ohara

(10) Patent No.: US 11,020,919 B2
(45) Date of Patent: Jun. 1, 2021

(54) TIRE VULCANIZATION MOLD, TIRE VULCANIZATION DEVICE, AND TIRE PRODUCTION METHOD

(71) Applicant: Toyo Tire Corporation, Itami (JP)

(72) Inventor: Masaaki Ohara, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 256 days.

(21) Appl. No.: 16/321,971

(22) PCT Filed: Aug. 12, 2016

(86) PCT No.: PCT/JP2016/003732
§ 371 (c)(1),
(2) Date: Jan. 30, 2019

(87) PCT Pub. No.: WO2018/029729
PCT Pub. Date: Feb. 15, 2018

(65) Prior Publication Data
US 2019/0176419 A1     Jun. 13, 2019

(51) Int. Cl.
*B29D 30/06* (2006.01)
*B29C 33/02* (2006.01)
*B29C 33/00* (2006.01)

(52) U.S. Cl.
CPC ......... *B29D 30/0629* (2013.01); *B29C 33/02* (2013.01); *B29C 33/005* (2013.01);
(Continued)

(58) Field of Classification Search
CPC ........ B29D 30/0629; B29D 2030/0612; B29D 2030/0617; B29C 33/005
See application file for complete search history.

(56) References Cited

U.S. PATENT DOCUMENTS 4,553,918 A * 11/1985 Yoda ................... B29D 30/0606
425/46
5,120,209 A * 6/1992 MacMillan ........ B29D 30/0606
264/326
(Continued)

FOREIGN PATENT DOCUMENTS

CN       101130330 A      2/2008
CN       102216044        10/2011
(Continued)

OTHER PUBLICATIONS

Office Action dated Jul. 3, 2020, issued in counterpart CN Application No. 2016800879270, with English translation (17 pages).
(Continued)

*Primary Examiner* — James P Mackey
(74) *Attorney, Agent, or Firm* — Westerman, Hattori, Daniels & Adrian, LLP

(57) ABSTRACT

A tire vulcanization mold disclosed herein includes sectors 13 divided in a tire circumferential direction and molding a tread portion 1, and a pair of upper and lower side plates 11 and 12 molding a sidewall portion 2 of a tire. Mold parting lines 16a and 17a formed by the sectors and the side plates are located in the tread portion 1. A lateral groove molding rib 18 molding a lateral groove 5 in the tread portion is provided to bridge from the sectors 13 to the side plates 11 and 12 and a protrusion molding recess 18a used to mold a protrusion 5a at a groove bottom of the lateral groove 5 is provided to the lateral groove molding rib 18. Mold parting planes 16 and 17 are provided to divide the lateral groove molding rib 18 at a position where the protrusion molding recess 18a is provided.

9 Claims, 8 Drawing Sheets

(52) U.S. Cl.
CPC ........... *B29D 2030/0612* (2013.01); *B29D 2030/0617* (2013.01)

(56) References Cited

U.S. PATENT DOCUMENTS

| | | | | |
|---|---|---|---|---|
| 5,800,642 | A * | 9/1998 | Ohya | B29D 30/0606 152/209.1 |
| 6,416,304 | B1 * | 7/2002 | Tanaka | B29C 33/10 425/28.1 |
| 7,980,281 | B2 * | 7/2011 | Ohara | B29D 30/0606 152/209.19 |
| 9,616,597 | B2 * | 4/2017 | Chades | B29C 33/42 |
| 10,456,952 | B2 * | 10/2019 | Ando | B29C 33/10 |
| 2007/0166419 | A1 * | 7/2007 | Tanaka | B29D 30/0606 425/35 |
| 2008/0047642 | A1 | 2/2008 | Ohara et al. | |
| 2008/0078487 | A1 | 4/2008 | Ohara | |
| 2011/0193265 | A1 | 8/2011 | Goto | |
| 2014/0377392 | A1 | 12/2014 | Yaguchi | |

FOREIGN PATENT DOCUMENTS

| | | | |
|---|---|---|---|
| CN | 104023930 | | 9/2014 |
| JP | 2000-84936 | A | 3/2000 |
| JP | 2001-96538 | A | 4/2001 |
| JP | 2004-188648 | A | 7/2004 |
| JP | 2006-168571 | A | 6/2006 |
| JP | 2008-87626 | A | 4/2008 |
| JP | 2010-99839 | A | 5/2010 |
| JP | 2012-236301 | * | 12/2012 |
| WO | WO 98/03357 | * | 1/1998 |

OTHER PUBLICATIONS

International Search Report dated Sep. 13, 2016, issued in counterpart International Application No. PCT/JP2016/003732 (2 pages).
Office Action dated May 12, 2020, issued in counterpart JP Application No. 2018-533296, with English Translation. (6 pages).
Office Action dated Feb. 4, 2021, issued in counterpart CN Application No. 201680087927.0, with English translation (17 pages).

* cited by examiner

TIRE VULCANIZATION MOLD, TIRE VULCANIZATION DEVICE, AND TIRE PRODUCTION METHOD

TECHNICAL FIELD

The present invention relates to a tire vulcanization mold, a tire vulcanization device including the tire vulcanization mold, and a tire production method.

BACKGROUND ART

A tire is produced by preparing an unvulcanized green tire first and then by vulcanizing the green tire while molding the green tire into a predetermined shape by using a tire vulcanization device.

A tire vulcanization device known in the art includes a vulcanization mold used to mold a green tire into a predetermined shape, which includes sectors for forming a tread portion of a tire, and a pair of upper and lower side plates for forming a sidewall portion of the tire.

While the tire vulcanization device is in a mold open state in which the upper side plate and the sectors are spaced apart from the lower side plate, a green tire is set on the lower side plate. Then, by moving down the upper side plate and moving the sectors inward in a tire radial direction, the tire vulcanization device is changed to a mold close state in which the upper side plate and the sectors are in close proximity to the lower side plate. The multiple sectors are divided in a circumferential direction. The sectors are radially separated in the mold open state whereas the sectors gather together and form an annular shape in the mold close state.

A pattern of various rugged shapes is provided to an outer surface of the tread portion and the sidewall portion. A rugged shape continuing from the tread portion to the sidewall portion is provided in some cases to make a design of the tire more sophisticated. In a case where such a pattern is provided, when mold parting lines formed by the sectors and the side plates are disposed to the sidewall portion, rubber squeezed out from the mold parting lines may possibly set at an easy-to-notice spot in outward appearance.

Meanwhile, a technique to dispose mold parting lines formed by the sectors and the side plates to the tread portion is known in the art (see Patent Literatures 1 and 2). With this technique, rubber squeezed out in the easy-to-notice sidewall portion can be limited.

CITATION LIST

Patent Literatures

Patent Literature 1: JP-A-2001-96538
Patent Literature 2: JP-A-2000-84936

SUMMARY OF INVENTION

Technical Problem

A protrusion to prevent, for example, stone trapping is disposed at a groove bottom of a lateral groove in a tread portion in some cases. Such a protrusion may possibly cause a hollow also called a bear formed by an air pocket due to poor discharge of air during vulcanization and molding, which may result in poor molding.

In view of the foregoing problems, the present invention has an object to provide a tire vulcanization mold capable of enhancing moldability of a protrusion disposed at a groove bottom of a lateral groove.

Solution to Problem

A tire vulcanization mold of the present invention is a tire vulcanization mold used to vulcanize and mold a tire, which includes sectors divided in a tire circumferential direction and molding a tread portion of the tire, and a pair of upper and lower side plates molding a sidewall portion of the tire. Mold parting lines formed by the sectors and a pair of the upper and lower side plates are located in the tread portion. A lateral groove molding rib molding a lateral groove in the tread portion is provided to bridge from the sector to the side plate and a protrusion molding recess used to mold a protrusion at a groove bottom of the lateral groove is provided to the lateral groove molding rib. A mold parting plane including the mold parting line is provided to divide the lateral groove molding rib at a position where the protrusion molding recess is provided.

In one embodiment, the mold parting plane may include an evacuation gap which opens to the protrusion molding recess. In such a case, the evacuation gap may be a recessed groove provided to either the sector or the side plate whichever has a higher thermal expansion rate.

A tire vulcanization device of the present invention includes any one of the tire vulcanization molds configured as above, a segment fixed to the sector and moving the sector in a tire radial direction, and a pair of upper and lower attachment plates fixed to a pair of the upper and lower side plates, respectively, and supporting the segment in a slidable manner.

In one embodiment, the tire molding device may be configured in such a manner that the segment includes a pair of upper and lower sliding surfaces sliding on a pair of the upper and lower attachment plates, respectively, a pair of the upper and lower sliding surfaces inclines toward a center in a tire width direction more on an outer side in a tire radial direction, and when the segment moves the sector outward in the tire radial direction, a pair of the upper and lower sliding surfaces slides on a pair of the upper and lower attachment plates, respectively, and spacings at the mold parting planes widen. In such a case, the mold parting planes may be provided parallel to the tire radial direction.

A tire production method of the present invention includes a forming step of forming a green tire, and a vulcanizing step of vulcanizing and molding the green tire by using the tire vulcanization device configured as above.

Advantageous Effects of Invention

According to the embodiments above, by setting the mold parting plane defined by the sector and the side plate at a position where the protrusion molding recess is provided, air in the protrusion molding recess can be discharged by using the mold parting plane. Hence, moldability of a protrusion at a groove bottom can be enhanced.

DESCRIPTION OF EMBODIMENTS

Hereinafter, embodiments of the present invention will be described with reference to the drawings.

Figure 1:
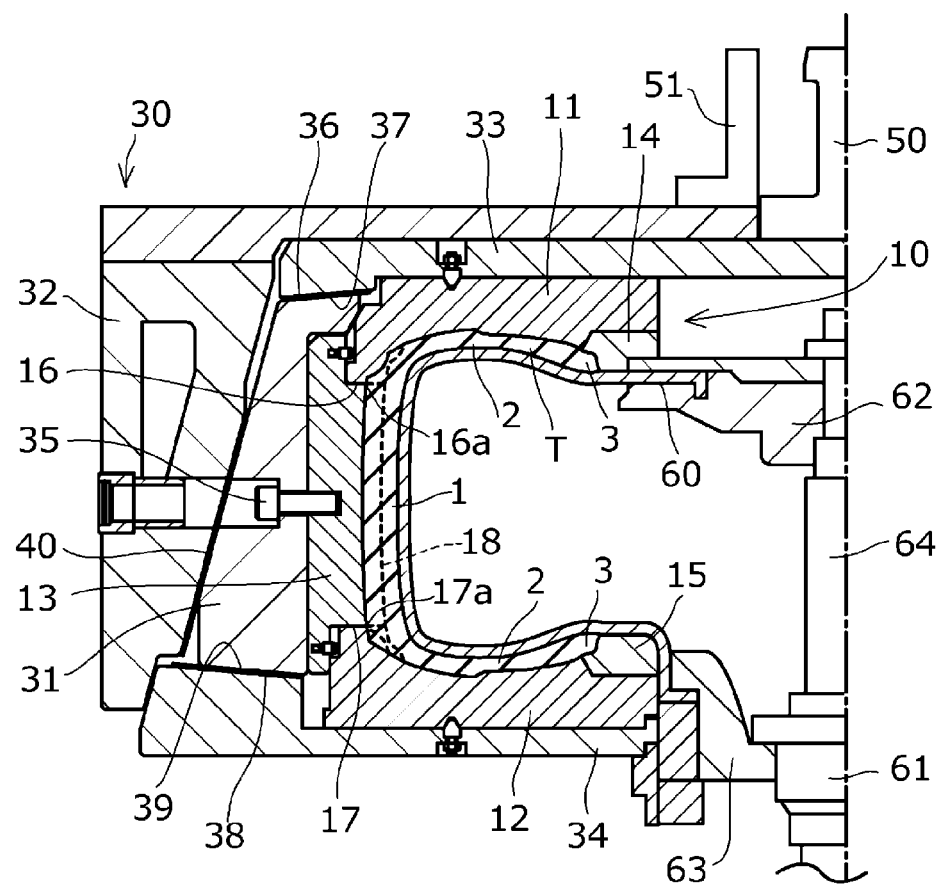
FIG. 1 is a half sectional view showing a tire vulcanization device according to one embodiment during vulcanization.

As is shown in FIG. 1, a tire vulcanization device includes a tire vulcanization mold (hereinafter, referred to simply as a vulcanization mold) 10, a container 30 to which the vulcanization mold 10 is attached, first lifting means 50 and second lifting means 51 which lift the vulcanization mold 10 and the container 30 up and down, and a bladder 60. The tire vulcanization device vulcanizes an unvulcanized green tire set with a tire axial direction aligned in a top-bottom direction while molding the green tire into a predetermined shape by heating and application of pressure.

The vulcanization mold 10 is a mold which includes a pair of an upper side plate 11 and a lower side plate 12, multiple sectors 13 divided in a circumferential direction, and a pair of upper and lower bead rings 14 and 15, and forms an outer surface (design surface) of a tire T. The vulcanization mold 10 can be made of a metal material, such as aluminum, aluminum alloy, and iron.

The sectors 13 are a mold which molds a tread portion 1 of the tire T. The multiple (for example, nine) sectors 13 are divided in a tire circumferential direction and allowed to undergo displacement radially (in a tire radial direction) by expansion and contraction. In a mold close state in which the respective sectors 13 are disposed at mold closing positions, the sectors 13 situated adjacently in the tire circumferential direction gather together and form an annular shape.

The upper side plate 11 is a mold which molds a sidewall portion 2 and a bead portion 3 disposed on an upper side of the tire T. The lower side plate 12 is a mold which molds a sidewall portion 2 and a bead portion 3 disposed on a lower side. The bead rings 14 and 15 are provided, respectively, on an inside of the upper side plate 11 and the lower side plate 12 in the tire radial direction. The bead rings 14 and 15 are formed for the bead portions 3 of the tire T to fit in.

The vulcanization mold 10 includes parting lines of a coupled mold which divide the mold in a tire width direction, to be more specific, a mold parting line 16a formed by the sectors 13 and the upper side plate 11 and a mold parting line 17a formed by the sectors 13 and the lower side plate 12. The mold parting lines 16a and 17a are located in the tread portion 1 of the tire T. Hence, the vulcanization mold 10 is configured to separate the sectors 13 from a pair of the upper and lower side plates 11 and 12 in the tire width direction in a tread surface.

Both of mold parting planes including the mold parting lines 16a and 17a, to be more specific, a mold parting plane 16 which is a coupled surface of the sectors 13 and the upper side plate 11 and a mold parting plane 17 which is a coupled surface of the sectors 13 and the lower side plate 12 extend outward in the tire radial direction from the mold parting lines 16a and 17a, respectively. Herein, both of the mold parting planes 16 and 17 are provided parallel (that is, horizontal) to the tire radial direction in which the sectors 13 move. The mold parting lines 16a and 17a are parting lines located at inner ends of the mold parting planes 16 and 17, that is, at ends facing a cavity.

Figure 3:
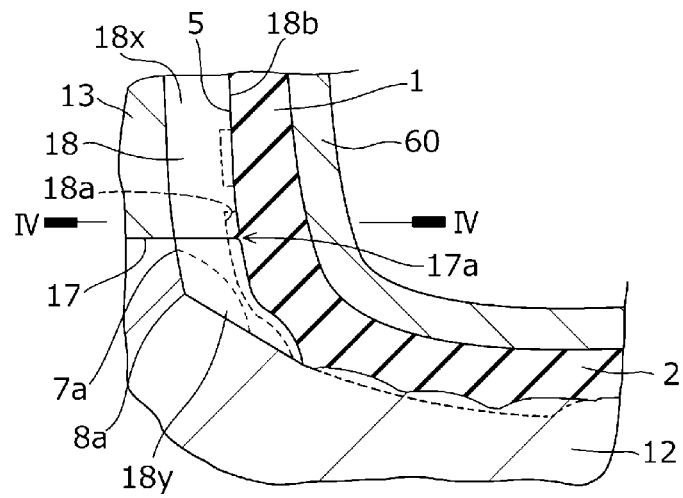
FIG. 3 is a sectional view taken along the line III-III of FIG. 2 during tire vulcanization.

The vulcanization mold 10 is provided with a main groove molding rib (not shown) used to mold a main groove extending in the tire circumferential direction in the tread portion 1 and a lateral groove molding rib 18 used to mold a lateral groove extending in the tire width direction in the tread portion 1 (see FIG. 3). The lateral groove molding rib 18 is provided to bridge from the sectors 13 to the side plates 11 and 12. Also, the lateral groove molding rib 18 is provided with a protrusion molding recess 18a used to mold a protrusion at a groove bottom of the lateral groove.

Figure 2:
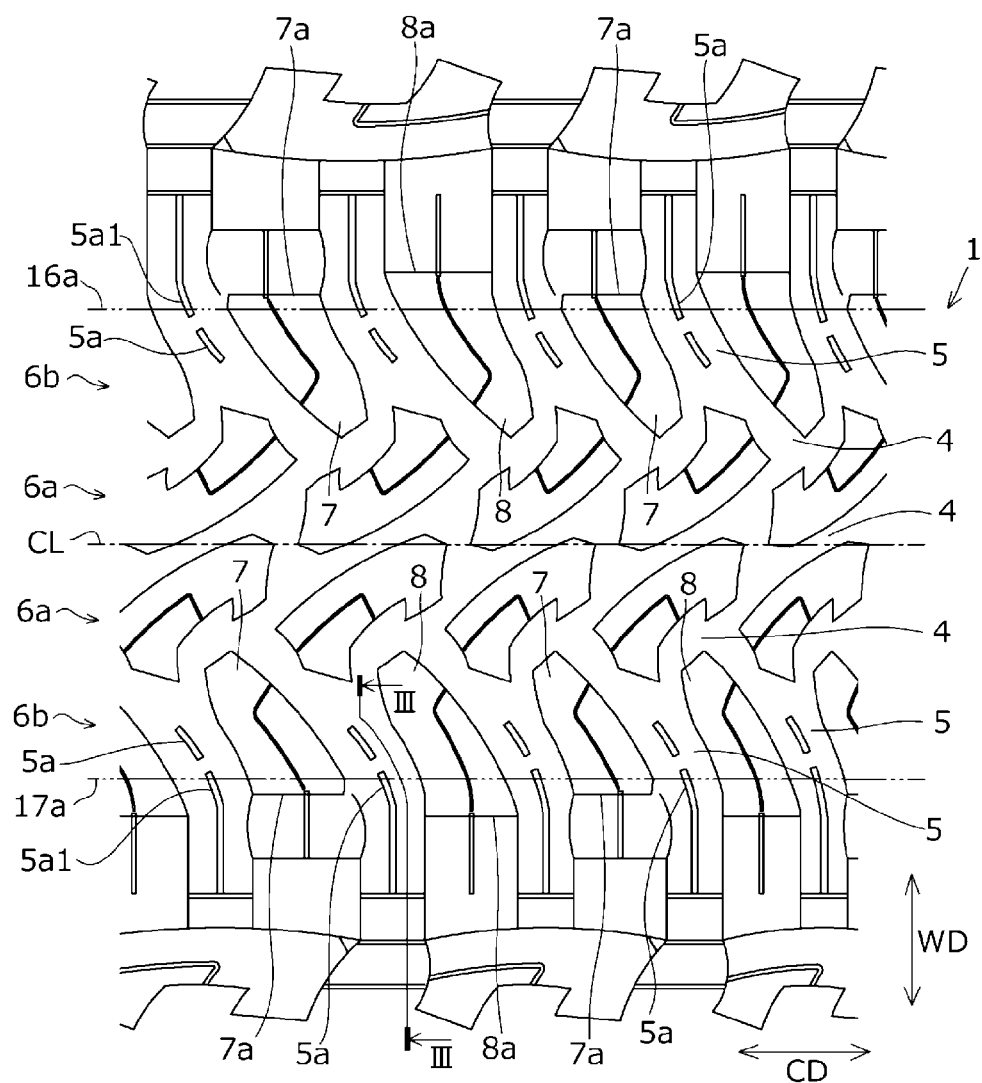
FIG. 2 is a plan view of a tread pattern of the embodiment.

FIG. 2 is a view showing an example of a tread pattern. The tread portion 1 includes multiple blocks divided by main grooves 4 extending in the tire circumferential direction while bending and lateral grooves 5 crossing the main grooves 4. In FIG. 2, the tire circumferential direction is a direction indicated by an arrow CD and the tire width direction is a direction indicated by an arrow WD. An inner side in the tire width direction (that is, on a side closer to a center) means a direction coming closer to a tire equator CL and an outer side in the tire width direction means a direction moving away from the tire equator CL.

The tread portion 1 has a pair of center block rows 6a and 6a located in a center region including the tire equator CL, and a pair of shoulder block rows 6b and 6b located in shoulder regions on both sides of the center block rows 6a and 6a. The shoulder regions mean regions located at ends of the tread portion in the tire width direction, in other words, regions sandwiched between the main grooves and tire contact ends and including the tire contact ends.

The shoulder block row 6b is formed by providing a first land portion (block) 7 having a first tread end 7a and a second land portion (block) 8 having a second tread end 8a located on the outer side than the first tread end 7a in the tire width direction alternately in the tire circumferential direction.

Figure 5:
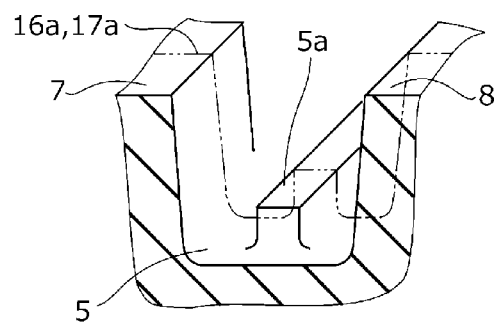
FIG. 5 is an enlarged perspective view of a major portion of a lateral groove of a tire.

As are shown in FIG. 2 and FIG. 5, a protrusion 5a to prevent stone trapping called a stone ejector is provided at a groove bottom of the lateral groove 5 dividing the first land portion 7 and the second land portion 8. The protrusion 5a is a streak of protrusion rising from the groove bottom and extending along a length direction of the lateral groove 5 in a center of the lateral groove 5 in the width direction, in short, a protruding strip. The protrusion 5a is spaced apart from side surfaces of the land portions 7 and 8 on the both sides. In each lateral groove 5, multiple (herein, two) protrusions 5a are provided at an interval in the length direction.

Figure 4:
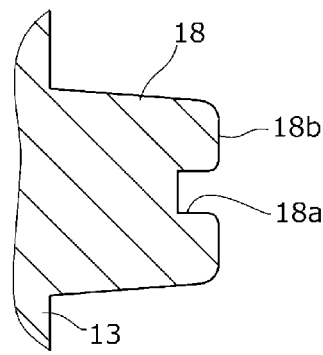
FIG. 4 is a sectional view of a lateral groove molding rib taken along the line IV-IV of FIG. 3.

The lateral groove molding rib 18 is a rib to mold the lateral groove 5 dividing the first land portion 7 and the second land portion 8. As are shown in FIG. 3 and FIG. 4, the lateral groove molding rib 18 is provided with the protrusion molding recess 18a used to mold the protrusion 5a in a top face 18b. Herein, the protrusion molding recess 18a is formed in the shape of a groove extending in a length direction of the lateral groove molding rib 18.

In the present embodiment, the mold parting planes 16 and 17 are set to traverse the protrusion molding recess 18a and divide the lateral groove molding rib 18 at a position where the protrusion molding recess 18a is provided. More specifically, as is shown in FIG. 2, the mold parting lines 16a and 17a not only traverse the first land 7 and the second land 8 of the shoulder block row 6b but also traverse the lateral groove 5 by passing the protrusion 5a in the shoulder region of the tread portion 1 (see FIG. 5). Herein, the mold parting lines 16a and 17a traverse a long protrusion 5a1, which is one of the two protrusions 5a located on the outer side in the tire width direction. The mold parting lines 16a and 17a extend parallel to the tire circumferential direction along an entire circumference and distances from the tire equator CL to the respective mold parting lines 16a and 17a are set to be constant along the entire circumference.

As is shown in FIG. 3, the lateral groove molding rib 18 provided to bridge from the sectors 13 to the lower side plate 12 is divided by the mold parting plane 17 at a position where the protrusion molding recess 18a is provided. Likewise, the lateral groove molding rib 18 provided to bridge from the sectors 13 to the upper side plate 11 is divided by the mold parting plane 16 at a position where the protrusion molding recess 18a is provided. Hence, the lateral groove molding rib 18 is formed of a first rib portion 18x provided to the sectors 13, and second rib portions 18y provided to the respective side plates 11 and 12, and formed by joining the first rib portion 18x and the second rib portions 18y in the mold parting planes 16 and 17.

The container 30 includes multiple segments 31 to hold the sectors 13, a jacket ring 32 for moving the segments 31 in the tire radial direction, an upper attachment plate 33 supporting the upper side plate 11 and the upper bead ring 14 and disposed on an upper side of the segments 31, and a lower attachment plate 34 supporting the lower side plate 12 and the lower bead ring 15 and disposed on a lower side of the segments 31.

The segments 31 are provided on the outside of the sectors 13 in the tire radial direction in a one-to-one correspondence with the divided sectors 13. The respective segments 31 are fixed to the corresponding sectors 13 with bolts 35.

On a top surface of the segment 31, an upper sliding surface 36 inclined toward a center in the tire width direction more on the outer side in the tire radial direction (that is, downward) is provided. The upper sliding surface 36 slides on an upper slide 37 provided to the upper attachment plate 33. On a bottom surface of the segment 31, a lower sliding surface 38 inclined toward the center in the tire width direction more on the outer side in the tire radial direction (that is, upward) is provided. The lower sliding surface 38 slides on a lower slide 39 provided to the lower attachment plate 34.

An angle of inclination of the upper sliding surface 36 and the lower sliding surface 38 is not particularly limited. However, an angle in a range of 5° to 10° both inclusive is preferable as the angle of inclination with respect to the tire radial direction. The upper sliding surface 36 and the lower sliding surface 38 provided to the segment 31 are preferably formed of planes having no curve and slide, respectively, on the upper slide 37 and the lower slide 39 in a surface-contact state.

A side surface of the segment 31 on an opposite side to the side surface where the sector 13 is attached (on the outer side in the tire radial direction) forms an inclined surface 40 which inclines downward and outward in the tire radial direction.

The jacket ring 32 is an annular member provided on the outside of the multiple segments 31 in the radial direction. An inner peripheral surface of the jacket ring 32 inclines along the inclined surface 40 of the segment 31 provided on the outer side in the tire radial direction, and is attached to the inclined surface 40 in a slidable manner. The jacket ring 32 moves the segments 31 in the tire radial direction as the jacket ring 32 slides on the inclined surface 40 by moving up and down relatively with respect to the segments 31. The sectors 13 are thus allowed to undergo displacement in the tire radial direction by expansion and contraction.

The upper side plate 11 and the upper slide 37 are fixed to a bottom surface of the upper attachment plate 33. The upper slide 37 is disposed on the outside of the upper side plate 11 in the tire radial direction at a position at which the upper slide 37 opposes the upper sliding surface 36 provided to the top surface of the segment 31 and supports the segment 31 in a slidable manner in the tire radial direction.

The lower side plate 12 and the lower slide 39 are fixed to a top surface of the lower attachment plate 34. The lower slide 39 is disposed on the outside of the lower side plate 12 in the tire radial direction at a position at which the lower slide 39 opposes the lower sliding surface 38 provided to the bottom surface of the segment 31 and supports the segment 31 in a slidable manner in the tire radial direction.

The first lifting means 50 lifts the upper attachment plate 33 up and down relatively with respect to the lower attachment plate 34. The second lifting means 51 lifts the jacket ring 32 up and down separately from the segments 31 supported on the upper attachment plate 33.

The bladder 60 is formed of an expandable and contractable rubber elastic body of a toroidal shape in which an axial center swells outward. The bladder 60 is set on an inner surface side of the green tire and swells with a supply of a pressurized gas (for example, steam or a nitrogen gas) and thereby applies a pressure to the green tire from inside. The bladder 60 is supported by an extendable support portion 61 at an upper end and a lower end which are both ends in an axial direction. The extendable support portion 61 includes an upper clamp ring 62 fixing the upper end of the bladder 60, a lower clamp ring 63 fixing the lower end of the bladder 60, and an extendable shaft 64 capable of extending and retracting.

A production method of a pneumatic tire using the tire vulcanization device configured as above will now be described. To produce a pneumatic tire, a green tire is formed by any method known in the art and the green tire is vulcanized and molded by using the tire vulcanization device described above.

Figure 6:
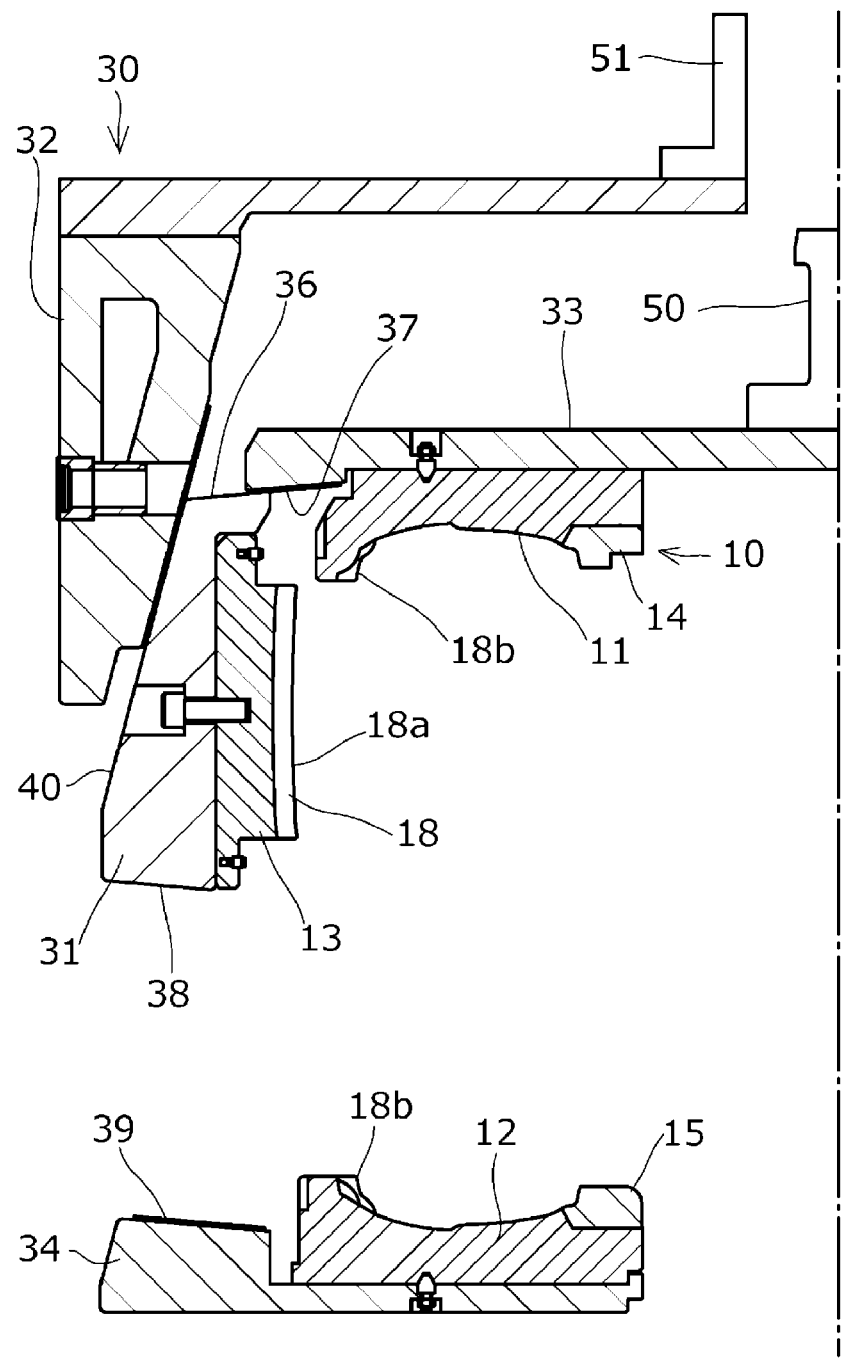
FIG. 6 is a view used to describe an opening and closing action of the tire vulcanization device.
Figure 7:
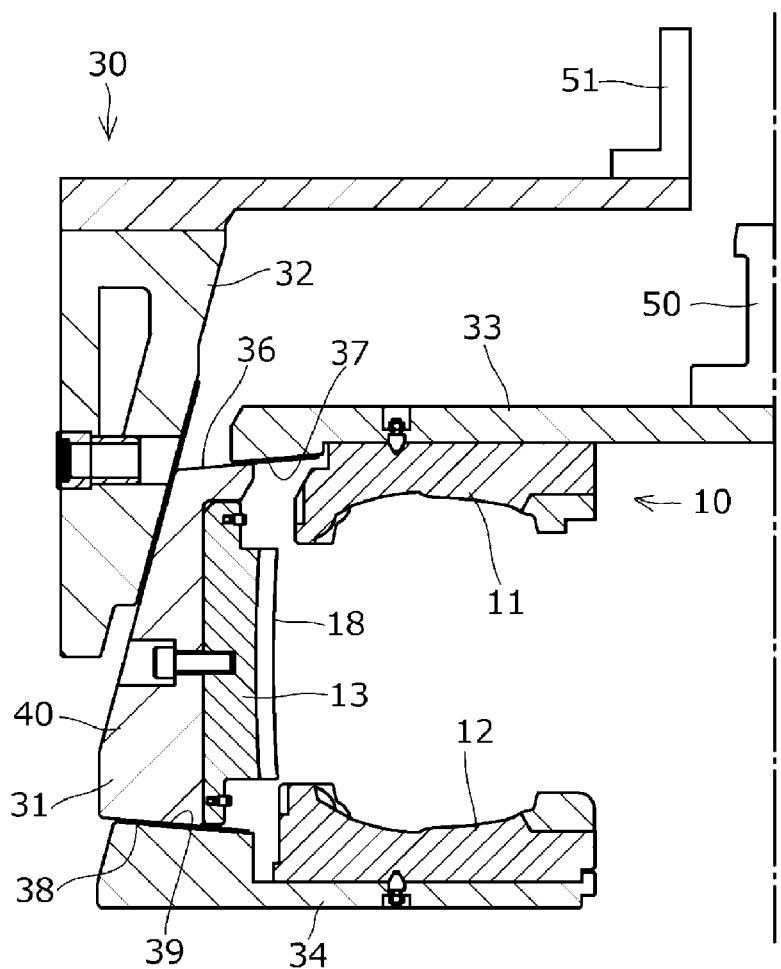
FIG. 7 is another view used to describe the opening and closing action of the tire vulcanization device.
Figure 8:
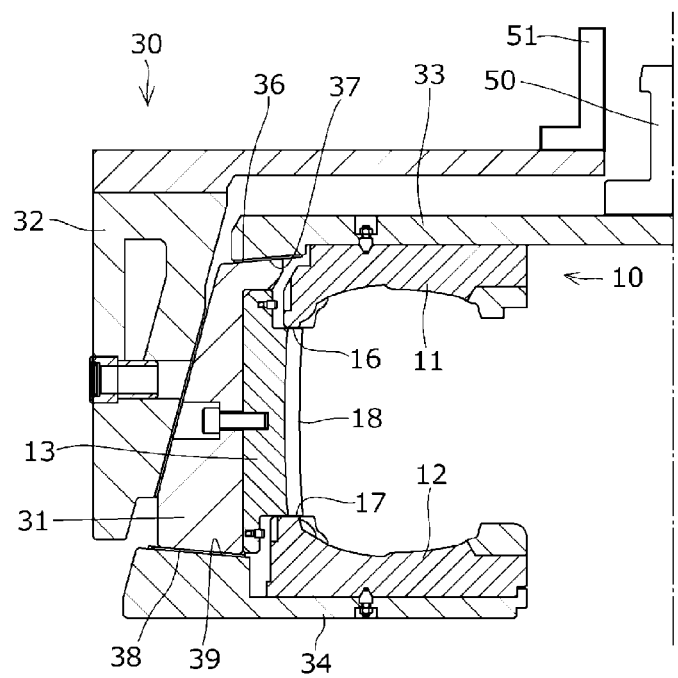
FIG. 8 is still another view used to describe the opening and closing action of the tire vulcanization device.

FIG. 6 through FIG. 8 are views used to describe an opening and closing action of the tire vulcanization device and the green tire and the bladder 60 are omitted from each drawing.

In a vulcanizing step, the green tire is attached to the vulcanization mold 10 of the tire vulcanization device in a mold open state and the bladder 60 is attached on the inner surface side of the green tire. FIG. 6 shows a mold open state in which the sector 13 and the upper side plate 11 are at positions spaced above the fixed lower side plate 12. In this state, the green tire is attached to the lower side plate 12 and then the container 30 is moved down. More specifically, by moving down the first lifting means 50, the upper side plate 11 and the sector 13 provided to the upper attachment plate 33 are moved down, that is, moved toward the lower side plate 12.

When the segment 31 makes contact with the lower attachment plate 34 as is shown in FIG. 7, the sector 13 held by the segment 31 is moved inward in the tire radial direction by lifting the jacket ring 32 down by using the second lifting means 51 as is shown in FIG. 8.

In this instance, the segment 31 moves inward in the tire radial direction as the lower sliding surface 38 slides on the lower slide 39 of the lower attachment plate 34 and the upper sliding surface 36 slides on the upper slide 37 of the upper attachment plate 33. The upper sliding surface 36 and the lower sliding surface 38 incline toward the center in the tire width direction more on the outer side in the tire radial direction. Hence, when the sector 13 together with the segment 31 moves inward in the tire radial direction, the upper side plate 11 moves down due to the inclination of the upper sliding surface 36 and the sector 13 moves down due to the inclination of the lower sliding surface 38.

Accordingly, a distance between the upper side plate 11 and the lower side plate 12 becomes shorter as the segment 31 moves inward in the tire radial direction. Spacings at the mold parting planes 16 and 17 defined by the sector 13 and the respective upper and lower side plates 11 and 12 vanish for the first time when the mold close state shown in FIG. 1 is achieved. That is, while the sectors 13 are moving inward in the tire radial direction, a clearance is still left at the mold parting plane 16 defined by the sectors 13 and the upper side plate 11. Also, a clearance is still left at the mold parting plane 17 defined by the sectors 13 and the lower side plate 12. These clearances at the mold parting planes 16 and 17 vanish when a diameter of the sectors 13 is fully reduced.

By changing the vulcanization mold 10 to the mold close state shown in FIG. 1 in the manner as above and swelling the bladder 60 with a pressurized gas supplied inside, the green tire is pressurized and heated between the vulcanization mold 10 and the bladder 60 and the green tire is vulcanized and molded to a tire T by being maintained in the state above for a predetermined time.

After the green tire is vulcanized, the vulcanization mold 10 is changed to a mold open state to perform a removing step of removing the vulcanized tire T from the tire vulcanization device. The vulcanization mold 10 is changed from the mold close state to the mold open state by performing the mold closing action inversely.

More specifically, the sector 13 held by the segment 31 is moved outward in the tire radial direction by lifting the jacket ring 32 up by using the second lifting means 51. In this instance, when the segment 31 moves outward in the tire radial direction as is shown in FIG. 8, the upper sliding surface 36 slides outward in the tire radial direction on the upper slide 37 attached to the upper attachment plate 33 while pushing up the upper attachment plate 33. Meanwhile, the lower sliding surface 38 slides outward in the tire radial direction by climbing up the lower slide 39 attached to the lower attachment plate 34.

Figure 9:
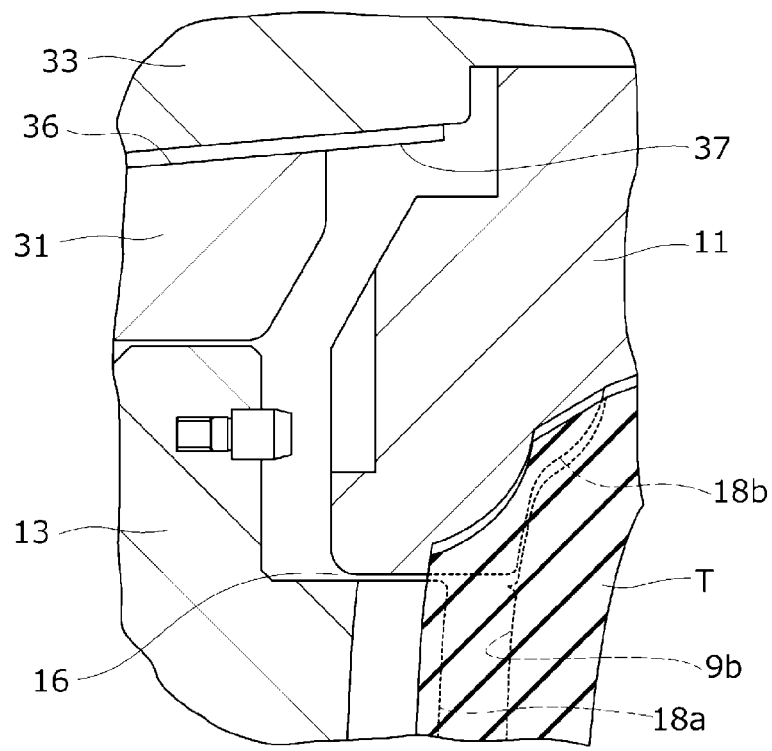
FIG. 9 is an enlarged view of a major portion of FIG. 8.

The upper attachment plate 33 pushed up by the upper sliding surface 36 moves upward with respect to the segment 31. Hence, when the segment 31 starts to move radially outward, as is shown in FIG. 9, the upper side plate 11 also moves upward with respect to the segment 31. Hence, a spacing at the mold parting plane 16 defined by the sector 13 and the upper side plate 11 increases.

Figure 10:
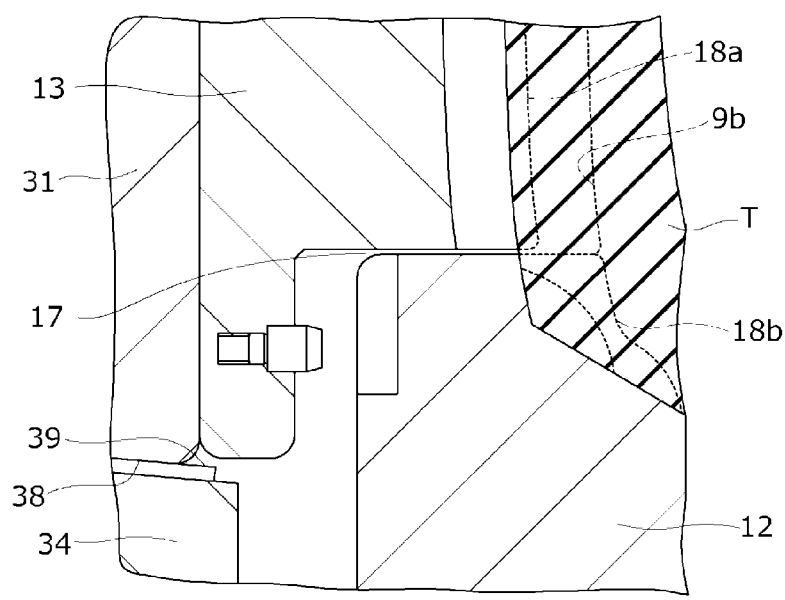
FIG. 10 is another enlarged view of the major portion of FIG. 8.

Meanwhile, in the lower sliding surface 38, when the segment 31 starts to move radially outward, as is shown in FIG. 10, the segment 31 moves upward with respect to the fixed lower attachment plate 34. Hence, a spacing at the mold parting plane 17 defined by the sector 13 and the lower side plate 12 increases.

After the diameter of the sectors 13 is fully increased as is shown in FIG. 7, the first lifting means 50 is moved up to move the upper side plate 11 and the sector 13 apart from the lower side plate 12 as is shown in FIG. 6. The vulcanized tire T is then removed from the tire vulcanization device changed to the mold open state.

In the present embodiment, as has been described above, the mold parting planes 16 and 17, which are coupled surfaces defined by the sectors 13 and the side plates 11 and 12, respectively, are set at a position where the protrusion molding recess 18a of the lateral groove molding rib 18 is provided. Hence, when the vulcanization mold 10 is closed, air in the protrusion molding recess 18a can be discharged by using the mold parting planes 16 and 17. In particular, in the present embodiment, spacings at the mold parting planes 16 and 17 are ensured until just before a mold closing action is completed due to inclinations of the upper sliding surface 36 and the lower sliding surface 38, and the protrusion molding recess 18a opens to the spacings. Hence, air can be evacuated effectively via the mold parting planes 16 and 17. Consequently, moldability can be enhanced by limiting a bear caused by the protrusion 5a.

In the present embodiment, when the segment 31 starts to move radially outward, spacings at the mold parting planes 16 and 17 defined by the sectors 13 and the upper side plate 11 and the lower side plate 12, respectively, increase owing to the inclinations of the upper sliding surface 36 and the lower sliding surface 38. Accordingly, even when the tire vulcanization device is repetitively opened and closed, rubbing of the mold parting planes 16 and 17 does not occur and spacings at the mold parting planes 16 and 17 can be maintained at an appropriate value. Durability of the tire vulcanization device can be thus enhanced. Moreover, the upper side plate 11 moves in a direction to separate from the vulcanized and molded tire T as soon as the segment 31 starts to move radially outward. Hence, the tire T can be readily released from the mold.

In the tire vulcanization device of the present embodiment, when the upper sliding surface 36 and the lower sliding surface 38 provided to the segment 31 are planes sliding, respectively, on the upper slide 37 and the lower slide 39 in a surface-contact state, the segment 31 is allowed to move with high positional accuracy without rattling. Misalignment of the sector 13 in a mold closed state can be thus limited.

In the present embodiment, the mold parting planes 16 and 17 are provided parallel to the tire radial direction. However, the mold parting planes 16 and 17 may be provided to incline diagonally with respect to the tire radial direction. That is, the mold parting planes 16 and 17 may be provided to incline to the outer side in the tire width direction more on the outer side in the tire radial direction. In such a case, too, a tire can be readily released from the mold owing to the inclinations of the upper sliding surface 36 and the lower sliding surface 38. In addition, in the event that the sliding surfaces 36 and 38 wear out due to repetitive mold opening and closing actions and an interval between the upper side plate 11 and the lower side plate 12 becomes narrower, the mold can be closed by gradually narrowing an interval between the upper side plate 11 and the lower side plate 12 in association with a movement of the segment 31 in the tire radial direction. Hence, rubbing of the mold parting planes 16 and 17 at an early stage can be limited, which can in turn enhance durability.

Figure 11:
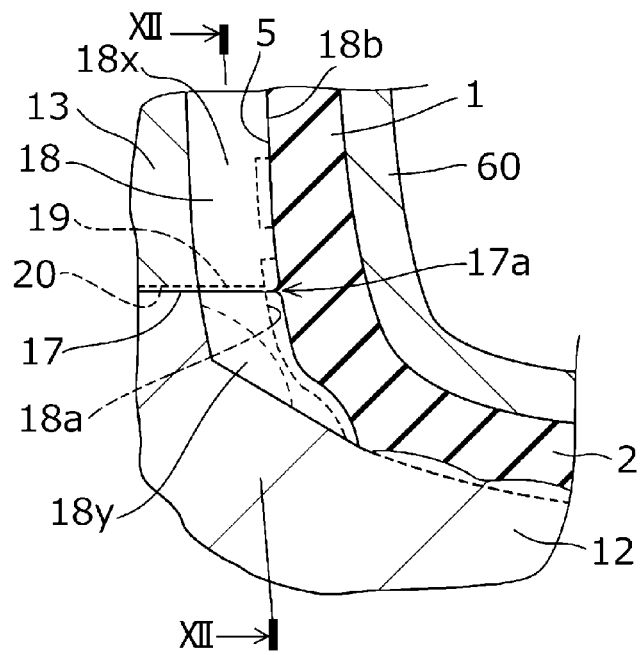
FIG. 11 is an enlarged sectional view of a major portion of a tire vulcanization device according to another embodiment during vulcanization.

FIG. 11 is a sectional view of a major portion of a tire vulcanization device according to a second embodiment during vulcanization. The second embodiment is different from the first embodiment above shown in FIG. 3 in that an evacuation gap 19 opening to a protrusion molding recess 18a is provided to mold parting planes 16 and 17.

Figure 12:
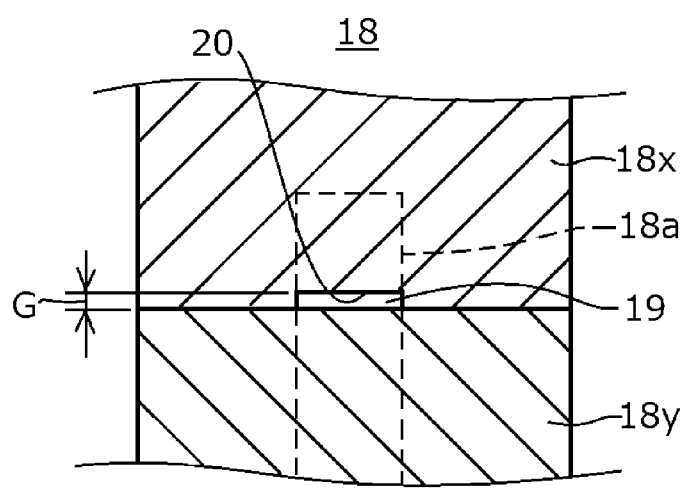
FIG. 12 is a sectional view of the lateral groove molding rib taken along the line XII-XII of FIG. 11.

In the second embodiment, as are shown in FIG. 11 and FIG. 12, a recessed groove 20 having a width comparable to the protrusion molding recess 18a is provided to one of joined surfaces of sectors 13 and a lower side plate 12 defining the mold parting plane 17 (herein, the joined surface of the sectors 13). When configured in this manner, the evacuation gap 19 is formed between the recessed groove 20 in one joined surface and the other opposing flat joined surface. Herein, the evacuation gap 19 is provided to open to the outside of a vulcanization mold 10 by traversing the mold parting planes 16 and 17. Although an illustration is omitted herein, a recessed groove 20 of a same configuration is also provided to the upper mold parting plane 16.

The recessed groove 20 is a shallow groove of a flat rectangular shape in cross section. A groove width, that is, an interval G of the evacuation gap 19 is not particularly limited. However, the interval G may be, for example, 0.02 to 0.04 mm. When the interval G is in such a range, rubber coming into the evacuation gap 19 can be effectively prevented while air is evacuated.

By providing the evacuation gap 19, which is a fine spacing as described above, to the mold parting planes 16 and 17, air in the protrusion molding recess 18a can be effectively discharged when the vulcanization mold 10 is closed. Moldability of a protrusion 5a can be thus enhanced further.

It is preferable to provide the recessed groove 20 to either the sectors 13 or the side plates 11 and 12 whichever have a higher thermal expansion rate (linear expansion coefficient). For example, when the sectors 13 are made of an aluminum material, such as aluminum and aluminum alloy, and the side plates 11 and 12 are made of iron, it is preferable to provide the recessed groove 20 to the sectors 13 because the aluminum material has the higher thermal expansion rate. When configured in this manner, the evacuation gap 19 becomes narrower due to expansion by heat during vulcanization and molding. Hence, rubber coming inside can be limited more effectively. Other configurations and advantageous effects of the second embodiment are same as the configurations and the advantageous effects of the first embodiment above and a description is omitted herein.

A tire referred to in the present embodiment includes a tire designed for an automobile, a heavy load tire designed for a truck, a bus, and a light truck (for example, a SUV or a pickup truck), and a pneumatic tire designed for various types of vehicles.

The embodiments above are presented as examples and have no intention to limit the scope of the invention. These novel embodiments can be implemented in various other manners and various omissions, replacements, and changes can be made within the spirit and scope of the invention.

REFERENCE SIGNS LIST

1: tread portion, 2: sidewall portion, 3: bead portion, 5: lateral groove, 5a: protrusion, 10: vulcanization mold, 11: upper side plate, 12: lower side plate, 13: sector, 16 and 17: mold parting planes, 18: lateral groove molding rib, 18a: protrusion molding recess, 19: evacuation gap, 20: recessed groove, 31: segment, 33: upper attachment plate, 34: lower attachment plate, 36: upper sliding surface, 38: lower sliding surface

The invention claimed is:

1. A tire vulcanization mold used to vulcanize and mold a tire, comprising:
    sectors divided in a tire circumferential direction and molding a tread portion of the tire;
    an upper side plate; and
    a lower side plate, the upper side plate and the lower side plate molding a sidewall portion of the tire, wherein
    mold parting lines formed by the sectors and each of the upper and lower side plates are located in the tread portion,
    a lateral groove molding rib molding a lateral groove in the tread portion, the lateral groove molding rib bridging from each of the sectors to each of the upper and lower side plates,
    a protrusion molding recess molding a protrusion at a groove bottom of the lateral groove, the protrusion molding recess extending along a length of the lateral groove molding rib, and
    a mold parting plane including one of the mold parting lines divides the lateral groove molding rib at a position where the protrusion molding recess is provided.

2. The tire vulcanization mold according to claim 1, wherein the mold parting plane includes an evacuation gap which opens to the protrusion molding recess.

3. The tire vulcanization mold according to claim 2, wherein the evacuation gap is a recessed groove provided to at least one of the sectors, the upper side plate, and the lower side plate having a higher thermal expansion rate than a thermal expansion rate of another of the sectors, the upper side plate, and the lower side plate.

4. A tire vulcanization device, comprising:
    the tire vulcanization mold according to claim 1;
    a segment fixed to at least one of the sectors and moving the at least one of the sectors in a tire radial direction;
    an upper attachment plate fixed to the upper side plate and slidably supporting the segment; and
    a lower attachment plate fixed to the lower side plate and slidably supporting the segment.

5. The tire vulcanization device according to claim 4, wherein
    the segment includes an upper sliding surface sliding on the upper attachment plate and a lower sliding surface sliding on the lower attachment plate,
    the upper and lower sliding surfaces incline in a tire radial direction toward a center in a tire width direction, and
    when the segment moves the at least one of the sectors outward in the tire radial direction, the upper and lower sliding surfaces slide on the upper and lower attachment plates, respectively, and spacings between the at least one of the sectors and each of the upper and lower side plates at the mold parting planes widen.

6. The tire vulcanization device according to claim 5, wherein the mold parting planes are provided parallel to the tire radial direction.

7. A tire production method, comprising:
    a forming step of forming a green tire; and
    a vulcanizing step of vulcanizing and molding the green tire by using the tire vulcanization device according to claim 4.

8. A tire production method, comprising:
    a forming step of forming a green tire; and a vulcanizing step of vulcanizing and molding the green tire by using the tire vulcanization device according to claim 5.

9. A tire production method, comprising:

a forming step of forming a green tire; and a vulcanizing step of vulcanizing and molding the green tire by using the tire vulcanization device according to claim 6.

\* \* \* \* \*